United States Patent Office 3,141,032
Patented July 14, 1964

3,141,032
DIALKYL PENTAERYTHRITOL DIPHOSPHO-NATES AND PHOSPHITE PHOSPHONATES
Lester Friedman, Beachwood Village, Ohio, assignor, by mesne assignments, to Union Carbide Corporation, a corporation of New York
No Drawing. Filed Jan. 23, 1963, Ser. No. 253,267
9 Claims. (Cl. 260—461)

The present invention relates to novel phosphonates.

It is an object of the present invention to prepare new heterocyclic phosphonates.

Another object is to develop new compounds which can impart flame resistance to polymers.

A further object is to prepare novel lubricants.

Still further objects and the entire scope of applicability of the present invention will become apparent from the detailed description given hereinafter; is should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing heterocyclic phosphonates having the formula

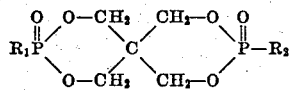

where $R_1$ and $R_2$ are alkyl groups having 1 to 18 carbons. Preferably, $R_1$ and $R_2$ have at least 8 carbon atoms.

The phosphonates of the present invention can be prepared by Arbuzov rearrangement of the corresponding phosphites, i.e., dialkyl pentaerythritol diphosphites. Methods of preparing the dialkyl pentaerythritol diphosphites are shown in Gould et al. Patent 2,961,454, column 6, lines 10–25, and Friedman et al. Patent 3,047,608, column 11, line 59, to column 12, line 2, and column 5, line 63, to column 6, line 14.

The Arbuzov rearrangement is carried out with the aid of heat and an alkyl halide catalyst or an alkali or alkaline earth bromide or iodide catalyst, e.g., lithium bromide, lithium iodide, sodium bromide, sodium iodide, potassium iodide, potassium bromide, magnesium iodide, magnesium bromide, calcium bromide, calcium iodide, barium bromide, barium iodide, strontium bromide and strontium iodide. Typical examples of alkyl halide include methyl bromide, methyl iodide, butyl bromide, butyl iodide, amyl bromide, amyl iodide, heptyl bromide, heptyl iodide, octyl bromide, octyl iodide, decyl bromide, decyl iodide, isodecyl bromide, lauryl bromide, lauryl iodide, octadecyl bromide, octadecyl iodide, decyl chloride. To avoid contamination it is preferable that the alkyl group of the alkyl halide catalyst have the same chain length as the alkyl group of the dialkyl pentaerythritol diphosphite.

Normally there is used 1 to 5 mol percent of the alkyl halide catalyst based on the amount of dialkyl pentaerythritol diphosphite [3,9-dialkoxy-2,4,8,10-tetraoxa-3,9-diphosphaspiro (5,5) undecane] employed. However, larger amounts of catalysts can be used, e.g. up to 200 mol percent based on the amount of dialkyl pentaerythritol diphosphite. Smaller amounts of catalyst can be used although this requires the use of a longer reaction period. In preparing the higher members of the series it is desirable to employ a temperature of at least 185° C. The reaction can be carried out at atmosphere, superatmospheric or subatmospheric pressure. In preparing the lower members of the series, e.g. dimethyl pentaerythritol diphosphonate, it is desirable to use superatmospheric pressure in order to use temperatures of 185° C. or above for the Arbuzov rearrangement. There can be used a sealed bomb or other pressure resistant vessel to obtain these temperatures.

While phospholanes readily rearrange with ring opening in the Arbuzov reaction, the phosphorinanes employed as starting materials in the present invention are much less subject to rearrangement than simple trialkyl phosphites and consequently, as indicated, relatively high temperatures are required.

Compounds which can be prepared according to the present invention include dimethyl pentaerythritol diphosphonate, diethyl pentaerythritol diphosphonate, dibutyl pentaerythritol diphosphonate, dihexyl pentaerythritol diphosphonate, diheptyl pentaerythritol diphosphonate, di octyl pentaerythritol diphosphonate, di 2-ethylhexyl pentaerythritol diphosphonate, di n-decyl pentaerythritol diphosphonate, di isodecyl pentaerythritol diphosphonate, di stearyl pentaerythritol diphosphonate (di octadecyl pentaerythritol diphosphonate), di lauryl pentaerythritol diphosphonate, methyl octadecyl pentaerythritol diphosphonate, decyl dodecyl pentaerythritol diphosphonate, di amyl pentaerythritol diphosphonate, di n-propyl pentaerythritol diphosphonate, di isopropyl pentaerythritol diphosphonate, di eicosanyl pentaerythritol diphosphonate.

As the starting dialkyl pentaerythritol diphosphites there can be used dimethyl pentaerythritol diphosphite, diethyl pentaerythritol diphosphite, di n-propyl pentaerythritol diphosphite, diisopropyl pentaerythritol diphosphite, dibutyl pentaerythritol diphosphite, diamyl pentaerythritol diphosphite, dihexyl pentaerythritol diphosphite, diheptyl pentaerythritol diphosphite, di octyl pentaerythritol diphosphite, di 2-ethylhexyl pentaerythritol diphosphite, di n-decyl pentaerythritol diphosphite, di isodecyl pentaerythritol diphosphite, di stearyl pentaerythritol diphosphite, dilauryl pentaerythritol diphosphite, methyl octadecyl pentaerythritol diphosphite, decyl dodecyl pentaerythritol diphosphite and di eicosanyl pentaerythritol diphosphite.

Unless otherwise indicated all proportions and percentages are by weight.

*Example 1*

Di stearyl pentaerythritol diphosphite was heated with 2 mol percent of n-octyl bromide for 4 hours at which time the reaction was complete as shown by infrared analysis.

The product was di stearyl pentaerythritol diphosphonate having the formula

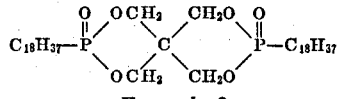

*Example 2*

The process of Example 1 was repeated using 4 mol percent of n-octyl bromide. The product was also di stearyl pentaerythritol diphosphonate.

*Example 3*

3200 grams (4.36 moles) of di stearyl pentaerythritol diphosphite (Weston WX–618), and 34 grams (0.174 mole) of n-octyl bromide were heated in a reaction vessel to 195–200° C. and maintained at this temperature for 5 hours. Volatile material was removed by stripping in a vacuum of 2–5 mm. with the aid of a nitrogen sparing stream towards the end of the stripping operation. About 45 grams of distillate were obtained. The distillate was mainly stearyl bromide. The hot liquid in the reaction vessel was allowed to cool somewhat, treated with Celite (diatomaceous earth) and filtered through a heated funnel.

The clear colorless filtrate amounted to 3120 grams and solidified to form di stearyl pentaerythritol diphosphonate as a hard brittle snow white crystalline solid. Infrared spectra was clear at 4μ and showed strong absorption at 8.0μ. The product was much nicer to handle than the corresponding isomeric di stearyl pentaerythritol diphosphite.

Example 4

Di stearyl pentaerythritol diphosphite was heated to 195° C. with 4 mol percent of stearyl bromide and maintained at this temperature for 6 hours to form di stearyl pentaerythritol diphosphonate.

Example 5

Di octyl pentaerythritol diphosphite was heated to 190° C. with 3 mol percent n-octyl iodide for 6 hours to form di octyl pentaerythritol diphosphonate. The octyl iodide was recovered by distillation.

Example 6

Di decyl pentaerythritol diphosphite was heated with 5 mol percent n-decyl bromide at 195° C. for 5 hours to form di decyl pentaerythritol diphosphonate. The low boiling n-decyl bromide was removed from the product by distillation.

Di isodecyl pentaerythritol diphosphonate was formed in similar fashion from di isodecyl pentaerythritol diphosphite and isodecyl bromide.

Example 7

Di lauryl pentaerythritol diphosphite was heated with 4 mol percent lauryl bromide at 195° C. in the manner described in Example 3 to form di lauryl pentaerythritol diphosphonate. The lauryl bromide was removed from the product by distillation.

Example 8

Dimethyl pentaerythritol diphosphite was heated with 4 mol percent of methyl bromide at 200° C. in a sealed bomb for 6 hours. The bomb was allowed to cool to room temperature and opened to allow the volatile methyl bromide to escape. The product in the bomb was dimethyl pentaerythritol diphosphonate.

Example 9

Decyl lauryl pentaerythritol diphosphite was heated with 4 mol percent of decyl bromide for 6 hours at 200° C. The alkyl bromide was distilled off and there was recovered as the residue in the reaction vessel decyl lauryl pentaerythritol diphosphonate.

Example 10

Dimethyl pentaerythritol diphosphite (256 g., 1 mole) and sodium iodide (7.5 g., 5 mole percent were heated at 175° C. for 6 hours. The reaction mixture at this point was essentially pure dimethyl pentaerythritol diphosphonate (iodine absorption 0). The pure material was restrained (free from inorganic ash) by distillation under reduced pressure.

In a similar manner using calcum bromide (anhydrous) instead of sodium iodide, the rearrangement was effected.

Example 11

Diethyl pentaerythritol diphosphite (284 g., 1 mole) and sodium iodide (7.5 g., 5 mole percent were heated at 175–180° C for 6 hours. At this time conversion to diphosphonate was complete. Distillation of the liquid at 5 mm. Hg pressure offered pure diethyl pentaerythritol diphosphonate, 272 grams, 95%.

Example 12

Distearyl pentaerythritol diphosphite was similarly converted into the corresponding phosphonate using the procedure of Example 11. The crude reaction mixture was best purified by treatment with anhydrous potassium carbonate and Attagel (attapulgus clay) and filtered hot (120° C.). The conversion was essentially quantitative.

The products of the present invention have numerous uses. Thus, they are useful as plasticizers for polyesters and vinyl resins, e.g., polyvinyl chloride. For example, there can be used 10–60 parts of the dialkyl pentaerythritol diphosphonate with 100 parts of a vinyl chloride resin, e.g. 30 parts of di octadecyl pentaerythritol diphosphonate with 100 parts of polyvinyl chloride. The products of the present invention can also be used as flame resistant lubricant fluids in gasoline engines and turbine engines. Furthermore they can be employed to give flame resistance to polymers such as polyethylene, polypropylene, and cellulose acetate.

The products are more stable to hydrolysis than the corresponding phosphites.

In the event that the Arbuzov rearrangement is not carried out for a sufficiently long period of time a product is obtained in which only one of the two phosphite groups has been converted to a phosphonate group. A compound of this type which can be prepared by reducing the time of reaction to 1 hour in Example 1 is di octadecyl pentaerythritol phosphite phosphonate having the formula $$C_{18}H_{37}OP\begin{matrix}OCH_2\\ \\OCH_2\end{matrix}C\begin{matrix}CH_2O\\ \\CH_2O\end{matrix}\overset{O}{\underset{\|}{P}}-C_{18}H_{37}$$

Other compounds of this type are di decyl pentaerythritol phosphite phosphonate, dimethyl pentaerythritol phosphite phosphonate and di octyl pentaerythritol phosphite phosphonate. Such compounds have the same uses as the diphosphonates but are not as stable to hydrolysis.

What is claimed is:

1. A compound having a formula selected from the group consisting of $$R_1O-P\begin{matrix}OCH_2\\ \\OCH_2\end{matrix}C\begin{matrix}CH_2O\\ \\CH_2O\end{matrix}\overset{O}{\underset{\|}{P}}-R_2$$

and $$R_1-\overset{O}{\underset{\|}{P}}\begin{matrix}OCH_2\\ \\OCH_2\end{matrix}C\begin{matrix}CH_2O\\ \\CH_2O\end{matrix}\overset{O}{\underset{\|}{P}}-R_2$$

where $R_1$ and $R_2$ are alkyl.

2. A compound having the formula $$R_1-\overset{O}{\underset{\|}{P}}\begin{matrix}OCH_2\\ \\OCH_2\end{matrix}C\begin{matrix}CH_2O\\ \\CH_2O\end{matrix}\overset{O}{\underset{\|}{P}}-R_2$$

where $R_1$ and $R_2$ are alkyl.

3. A compound according to claim 2 wherein $R_1$ and $R_2$ each have 8 to 18 carbon atoms.

4.

$$C_{18}H_{37}\overset{O}{\underset{\|}{P}}\begin{matrix}OCH_2\\ \\OCH_2\end{matrix}C\begin{matrix}CH_2O\\ \\CH_2O\end{matrix}\overset{O}{\underset{\|}{P}}C_{18}H_{37}$$

5.

$$C_{10}H_{21}\overset{O}{\underset{\|}{P}}\begin{matrix}OCH_2\\ \\OCH_2\end{matrix}C\begin{matrix}CH_2O\\ \\CH_2O\end{matrix}\overset{O}{\underset{\|}{P}}C_{10}H_{21}$$

6.

$$C_{12}H_{25}\overset{O}{\underset{\|}{P}}\begin{matrix}OCH_2\\ \\OCH_2\end{matrix}C\begin{matrix}CH_2O\\ \\CH_2O\end{matrix}\overset{O}{\underset{\|}{P}}C_{12}H_{25}$$

7.

$$R_1\overset{O}{\underset{\|}{P}}\begin{matrix}OCH_2\\ \\OCH_2\end{matrix}C\begin{matrix}CH_2O\\ \\CH_2O\end{matrix}POR_2$$

where $R_1$ and $R_2$ are alkyl.

8.
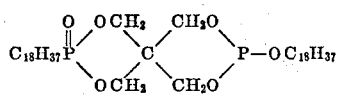
9.
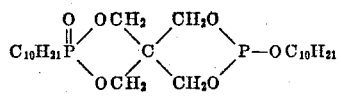
References Cited in the file of this patent
UNITED STATES PATENTS
2,726,256   Morris et al. _____ Dec. 6, 1955
OTHER REFERENCES
Weston Chemical Corporation product list WC-8 (Oct. 1961), 1 page.
Pure Chemicals Limited provisional leaflet "New Developments in Organo-Phosphorus Compounds" (April 1962), 5 pp.